C. E. PATRIC.
DISTRIBUTERS FOR GRAIN-DRILLS.

No. 188,404. Patented March 13, 1877.

Witnesses:
Alexander Mahon
John G. Center

Inventor
Charles E. Patric
by A. M. Smith
Attorney

UNITED STATES PATENT OFFICE.

CHARLES E. PATRIC, OF SPRINGFIELD, OHIO.

IMPROVEMENT IN DISTRIBUTERS FOR GRAIN-DRILLS.

Specification forming part of Letters Patent No. 188,404, dated March 13, 1877; application filed December 7, 1876.

*To all whom it may concern:*

Be it known that I, CHARLES E. PATRIC, of Springfield, county of Clarke, State of Ohio, have invented certain new and useful Improvements in Distributers for Grain-Drills, of which the following is a full, clear, and exact description, reference being had to the accompanying drawing, making part of this specification, in which—

Figure 1:
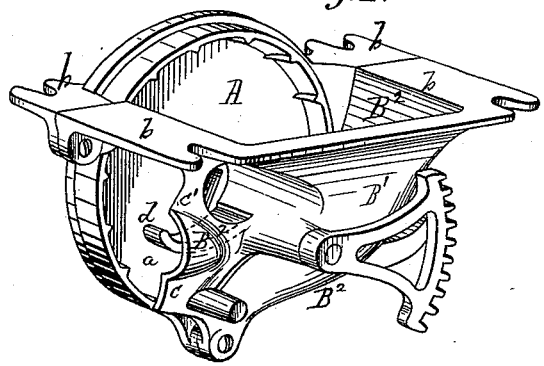
Figure 2:
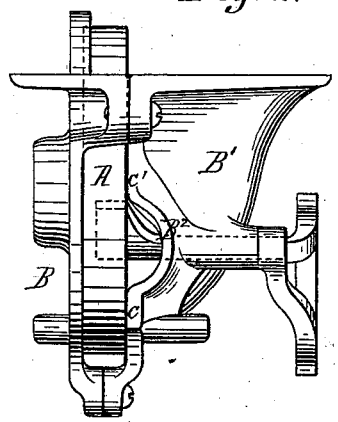
Figure 3:
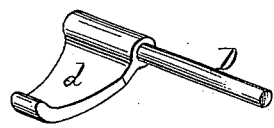

Figure 1 represents a perspective view of one of my improved distributers. Fig. 2 is a rear elevation of the same, and Fig. 3 is a perspective view of one of the adjustable gages.

Similar letters of reference denote corresponding parts wherever used.

My invention relates to that class of seeding-machines employing what is termed a vertical "force" feed—that is to say, one in which the distributing or measuring channel is formed at the side of a wheel mounted on a horizontal shaft, and between said wheel and its side casing-plate, and employing also an adjustable gage or tongue piece within said channel for regulating its size and capacity.

My improvement consists in a novel formation of the channel referred to, whereby it is made concave in form and converging or tapering from the grain-box to the discharge-outlet, the concave forming only a portion of the channel at said outlet, and adapted, by means of the adjustable gage, to be added, either wholly or in part, to or to be cut off from, the measuring-channel, for changing its form and capacity, and thereby adapting it, by the simple adjustment of the gage, to all the different varieties of grain and seed which it is required to operate upon, as hereinafter explained.

In the accompanying drawing, A represents the flanged vertical distributing-wheel, and B B¹ the side casing-plates, said parts, except in details hereinafter described, being constructed and arranged or combined in a manner described in a former application. The casing-plate B¹, between which and the flanged wheel the grain is discharged, has a concavity formed in its face adjacent to the wheel, at B², extending from its upper end, where it is adapted, by flanges $b\ b$, to be attached to the bottom of the grain-box, to the discharge-outlet at $a$, converging between said points, and forming a converging half-funnel, curving from the hopper and downward in front of, underneath, and to the rear of, the central shaft, by which the wheel A is rotated, as shown, said curved converging concavity forming, in connection with the vertical face and peripherical flange of the wheel A, the distributing-channel through which the grain is conveyed from the grain-box to the conductor-spouts or discharge-outlet $a$. The walls of the casing-plate B¹ above and below the discharging end of the concavity are made vertical, or nearly so, as shown at $c\ c'$, and converge slightly inward toward the discharge-outlet $a$, forming seats for the swinging end of a tapering gage, $d$, attached to and made adjustable by means of a rock-shaft, D, journaled in the casing-plate B¹, as shown. The vertical wall $c$, between the concavity B² and the flange of the wheel A, is extended beyond what is required to form a seat for the tongue or gage, and when the said gage is adjusted or thrown downward below said concavity, sufficient space is left between it and the flange to permit the passage of the smaller grains, affording ample room for the further adjustment of the gage to adapt the channel thus formed to the kind of grain and to the quantity to be distributed to the acre.

For adapting the channel to larger or lighter grain the gage is adjusted either into the plane of or above the concavity into its seat $c'$, thus bringing said concavity, at its discharging end, either wholly or in part, into the measuring-channel, as may be necessary to adapt said channel to the grain operated upon, the gage, in either case, forming the upper wall of said channel at its discharging end.

By the construction and arrangement described, it will be evident that the measuring-channel can be not only materially varied in size, but, also, that its form may be changed at its discharging end, thereby more fully adapting it to the size and kind of grain to be operated upon.

The means for adjusting, simultaneously, the several gages in the series of distributers employed are described in my former application referred to, and they need not, therefore, be further described here.

Having now described my invention, what

I claim as new, and desire to secure by Letters Patent, is—

1. The casing-plate $B^1$, provided with the converging concave channel extending to the outlet-opening, and having the vertical walls $c\ c'$ above and below said channel, at its discharging end, arranged and operating as described.

2. The casing-plate $B^1$, provided with the converging concave channel extending to the outlet-opening, and having the vertical walls $c\ c'$ above and below said channel, at its discharging end, in combination with the adjustable gage $d$, arranged and operating as described.

3. The combination, with the distributer-wheel casing $B^1$, having the concave converging portion $B^2$ of the measuring-channel, as described, of the adjustable gage $d$, adapted to vibrate across said concave portion of the channel, at its discharging end, substantially as and for the purpose described.

CHARLES E. PATRIC.

Witnesses:
A. P. LINN COCHRAN,
C. F. YOKEY.